Figure 11:
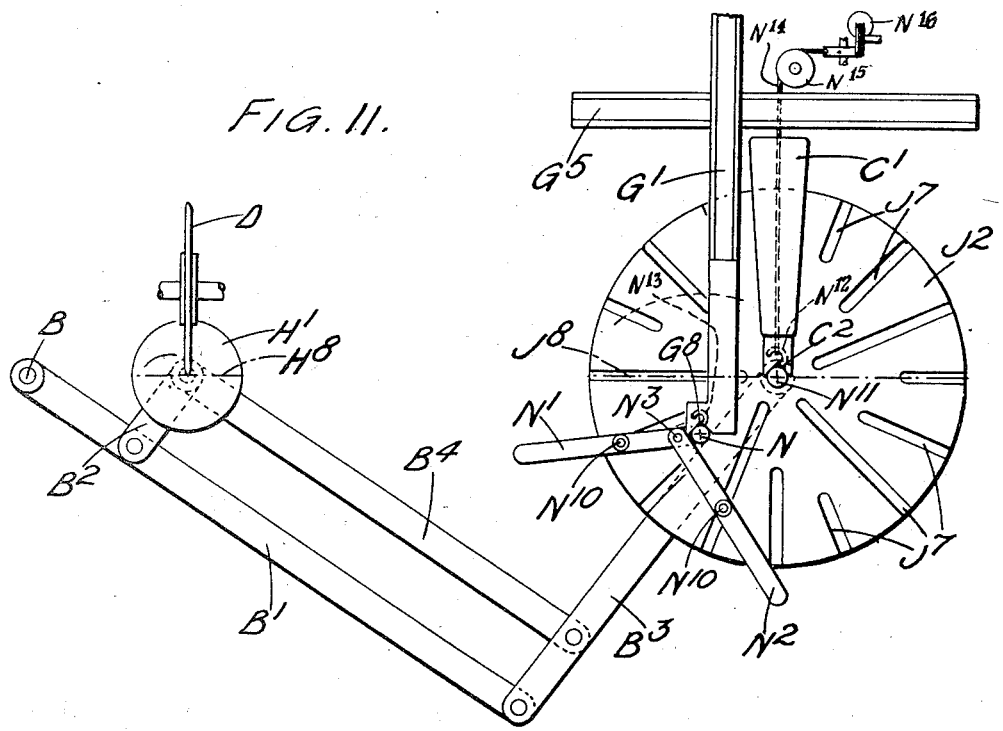

Nov. 7, 1939.     W. TAYLOR ET AL     2,179,388
ENGRAVING MACHINE OR THE LIKE
Original Filed July 1, 1937    9 Sheets-Sheet 1
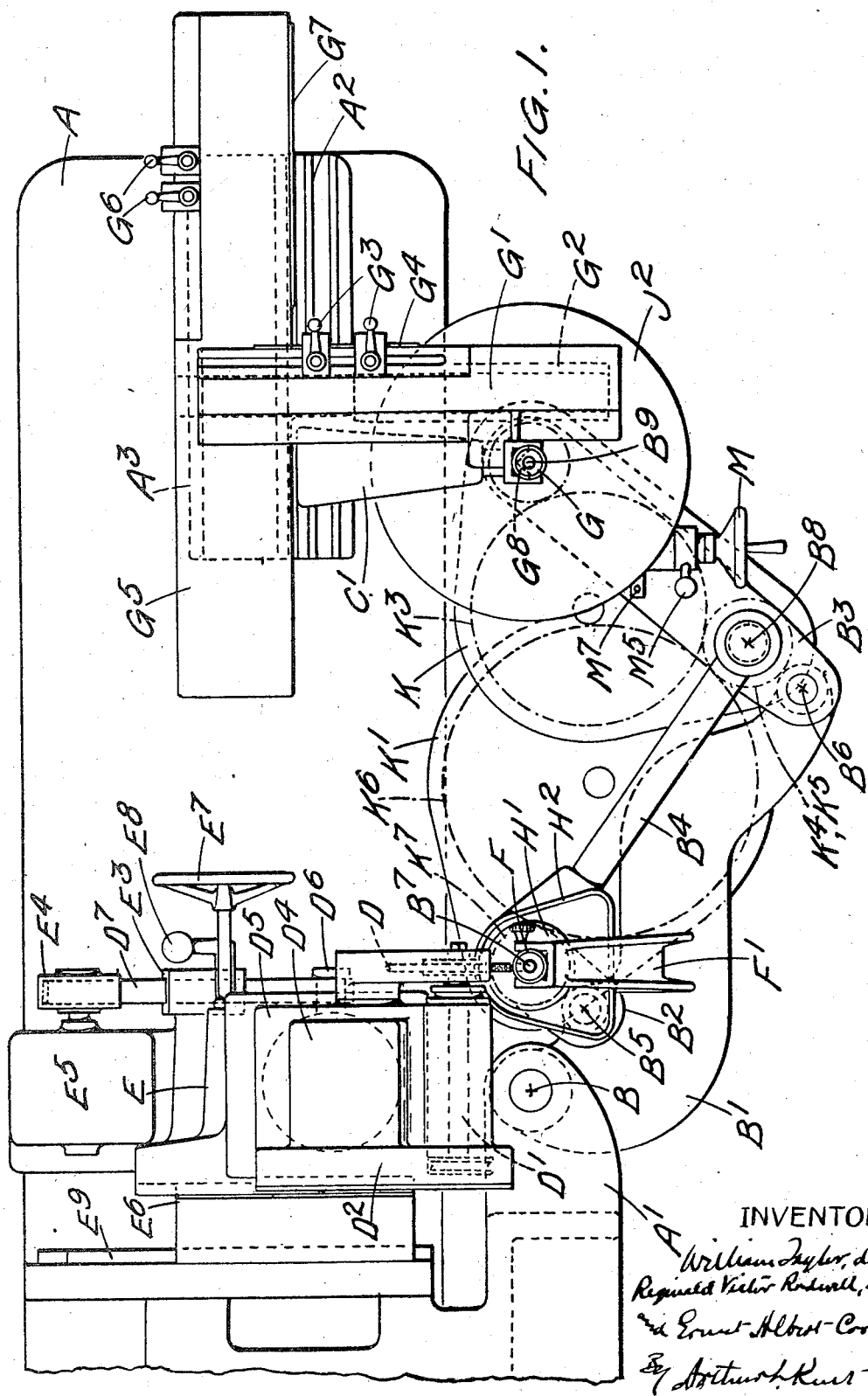

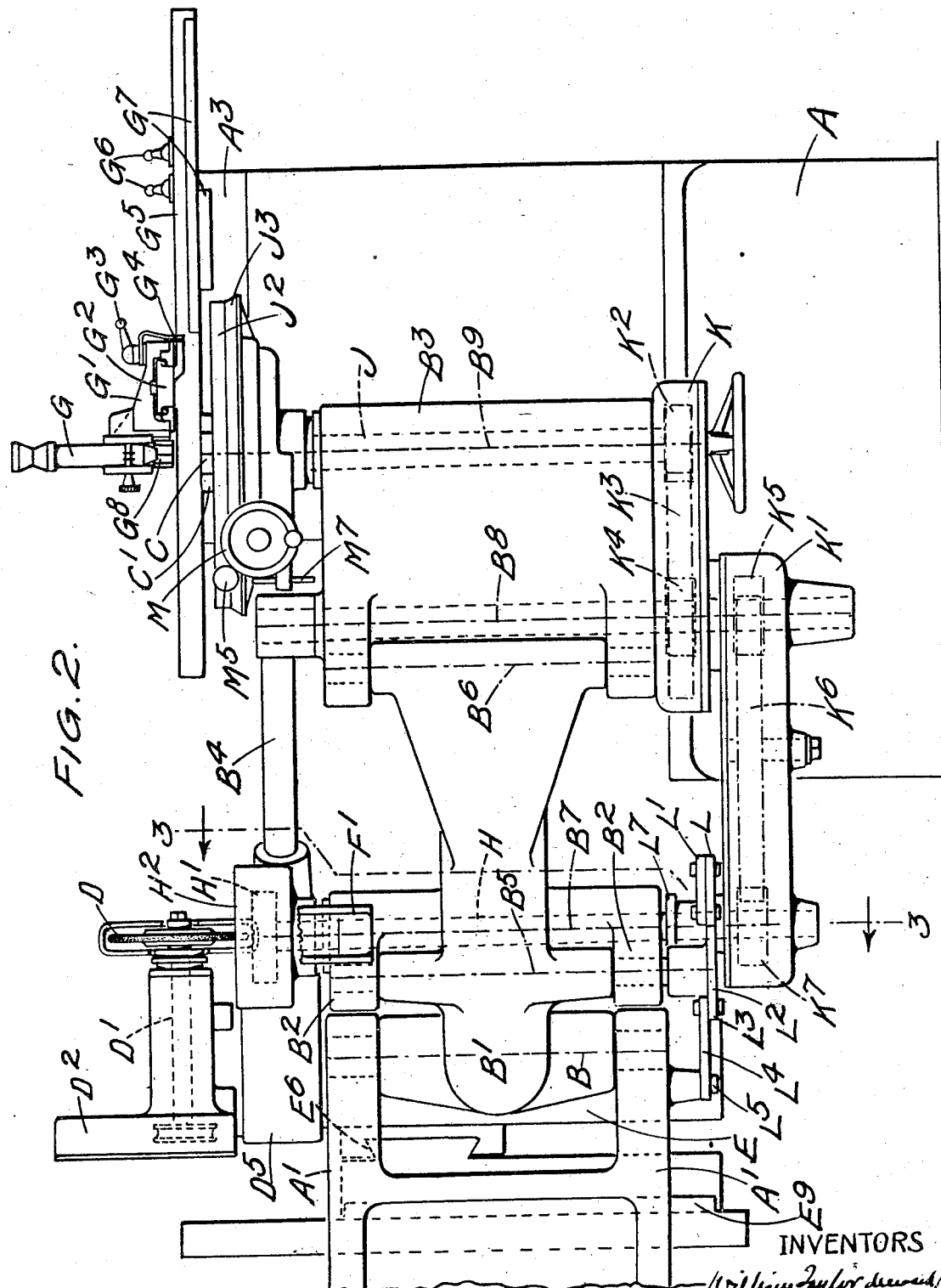

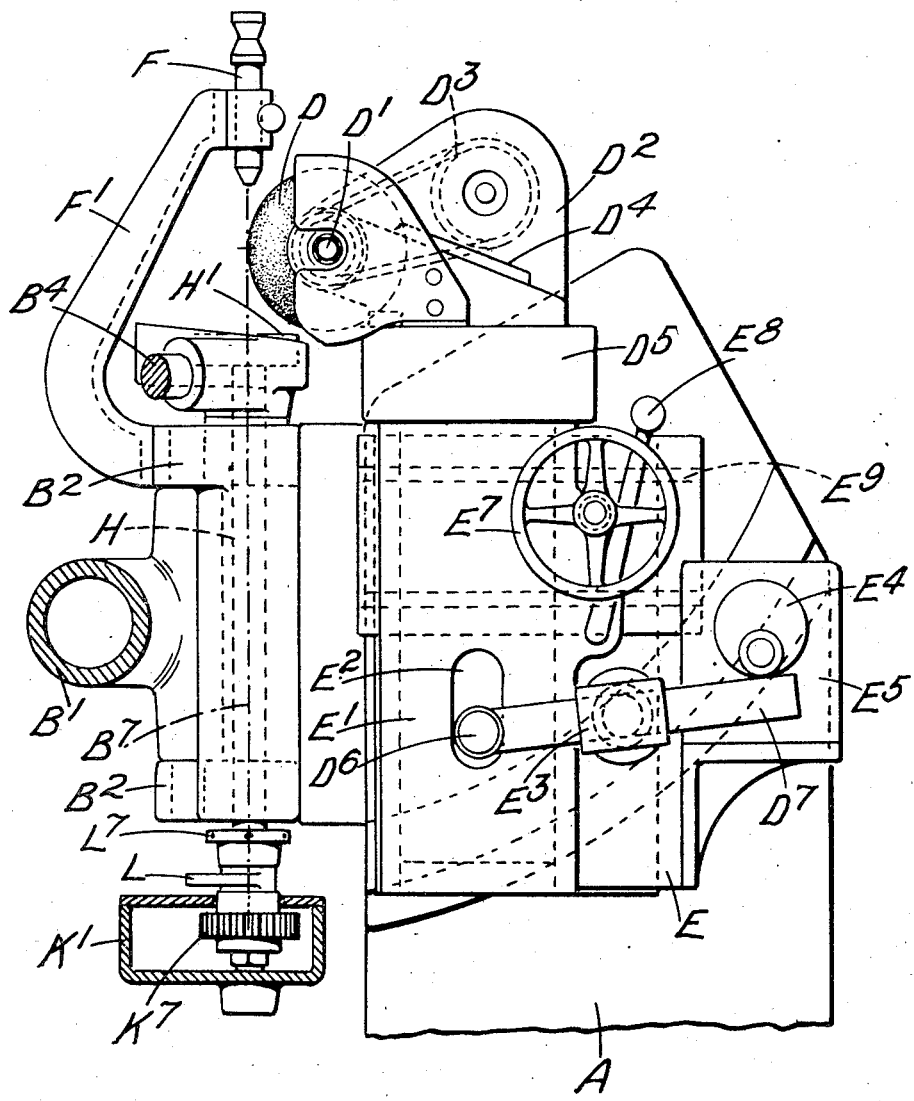

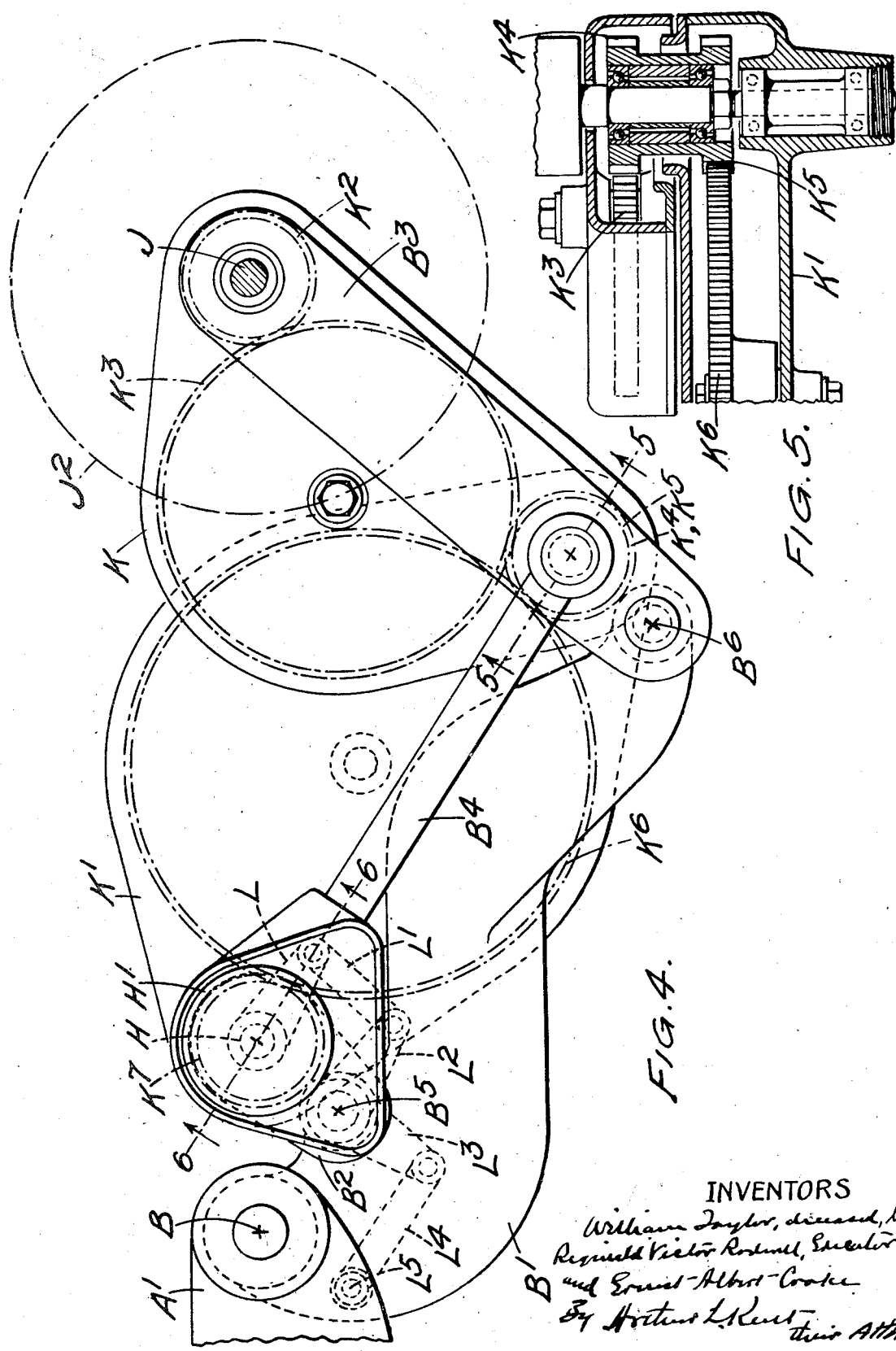

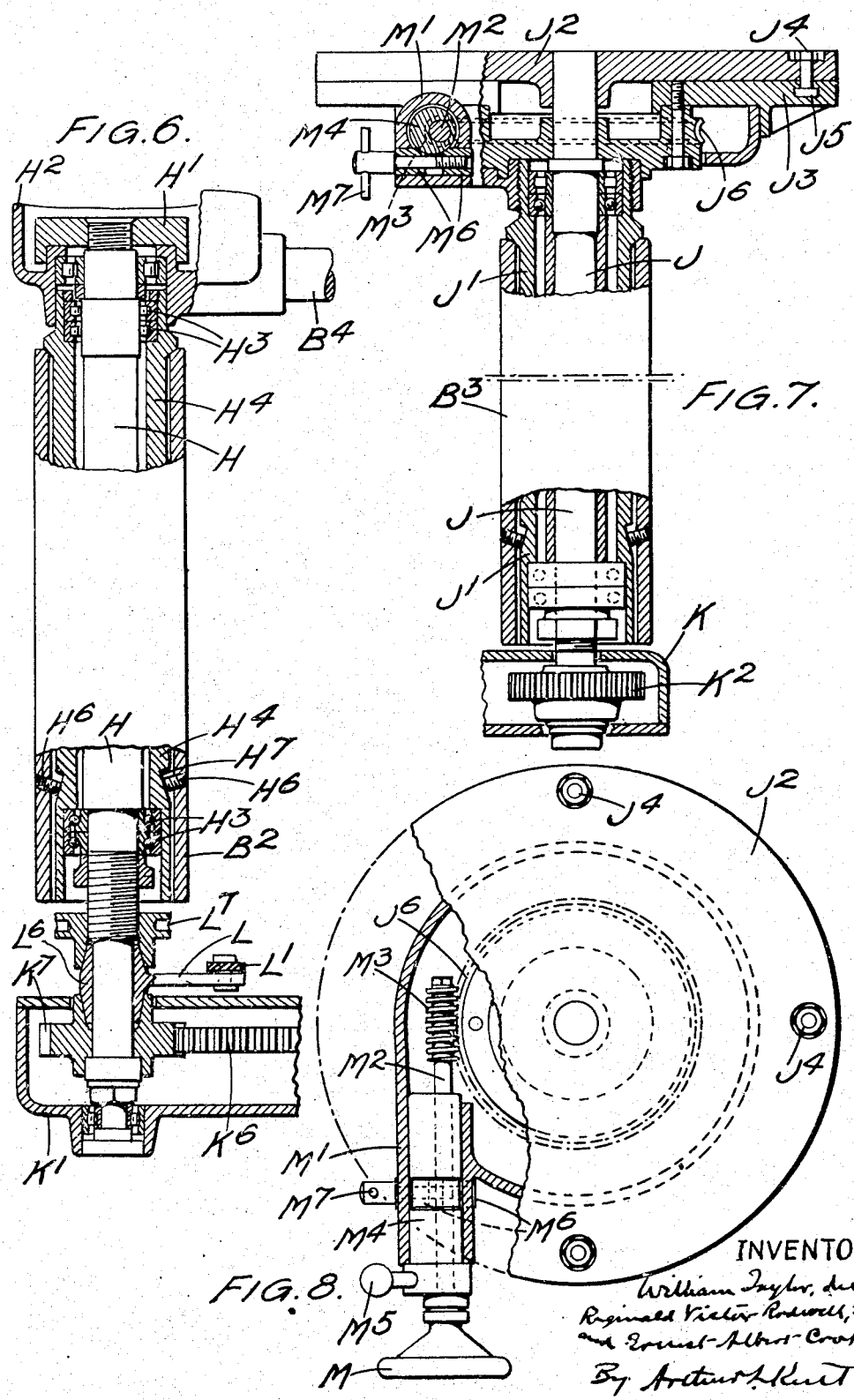

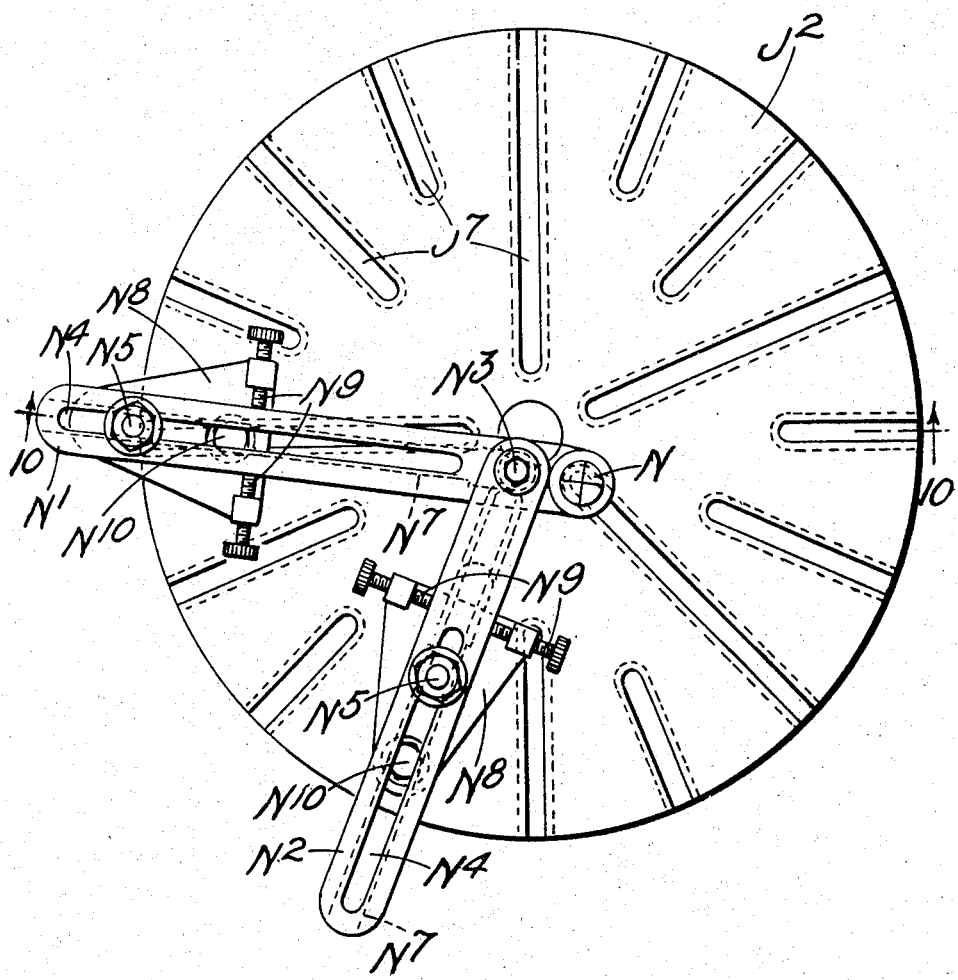
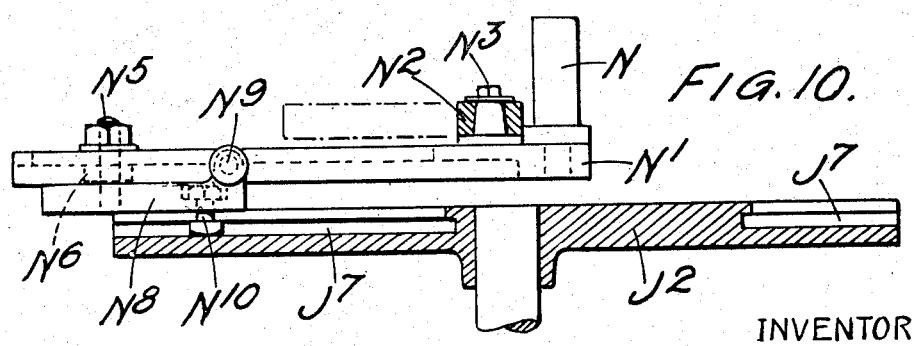

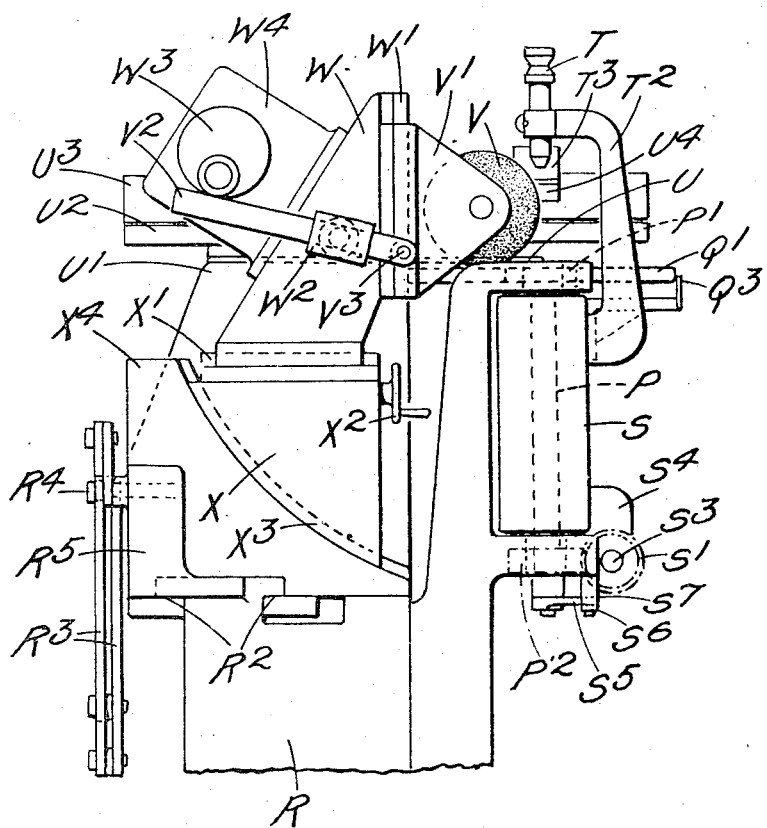

Patented Nov. 7, 1939

2,179,388

UNITED STATES PATENT OFFICE 2,179,388

ENGRAVING MACHINE OR THE LIKE

William Taylor, deceased, late of Leicester, England, by Reginald Victor Rodwell, executor, Leicester, England, and Ernest Albert Cooke, Leicester, England, assignors to Kapella Limited, Leicester, England, a company of Great Britain Application July 1, 1937, Serial No. 151,516. Renewed July 15, 1938. In Great Britain July 9, 1936

63 Claims. (Cl. 51—101)

This invention relates to engraving machines or the like of the kind having four relatively movable supports (namely a tool support, a work support, a tracer support and a copy support), which are mechanically interconnected in such a manner that during normal operation of the machine the geometrical relationship (at least in two dimensions) between the tool and work supports or the elements carried thereon is maintained in strict ratio to that between the tracer and copy supports or elements carried thereon. The nature of the tool employed will depend on the operation to be performed on the work, and the tool may consist, for example, of an abrasive wheel or an end mill for grinding or cutting the work of a stylus or other marking device for imparting surface markings to the work. For the purpose of operating on the work the tool may have rotary or reciprocating or rotary and reciprocating movement relative to the work, such movement being independent of and superimposed on the above-mentioned relative movement between the four supports.

Machines of this kind are used for a variety of purposes, such for example as for shaping, milling or grinding profile gauges, formed tools, punches for metal stampings and the like. Usually the copy support carries a copy or model or template or drawing, with which a tracer having a form corresponding to the operative part of the tool cooperates, so that the tool will produce on the work a profile which is a scale reproduction of the profile of the copy.

The present invention has for its primary object to provide a machine of this kind, wherein a very high degree of accuracy is obtained without sacrifice in speed of operation. More specific objects are to enable the machine to be utilised for producing on the work straight or circular work forms from basic measurements without importing such errors as might be resident in a drawing or template; and generally to effect improvements in the mechanical construction of the machine to ensure reliability in operation and to facilitate manipulation thereof.

A further object of the invention is to provide an improved transmission mechanism for maintaining exact synchronism between the rotations of two parallel shafts which are movable relatively to one another in space, such mechanism being more especially, but not exclusively, intended for interconnecting shafts carrying the work and copy supports in certain embodiments of an engraving machine or the like of the kind above mentioned.

Figure 12:
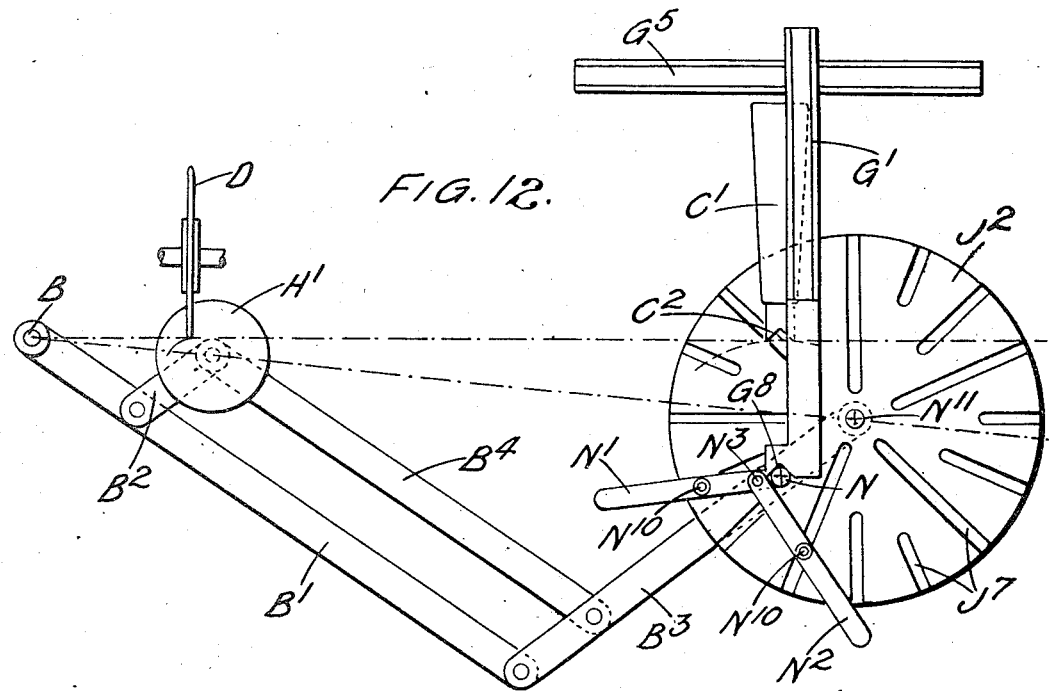
Figure 13:
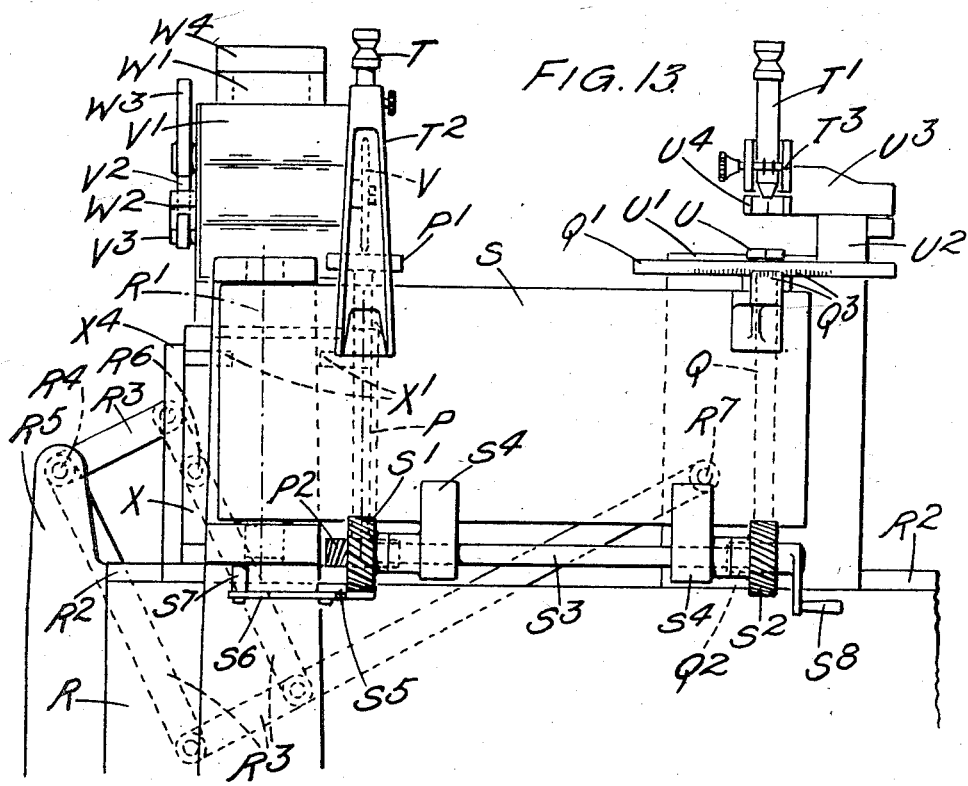
Figure 14:
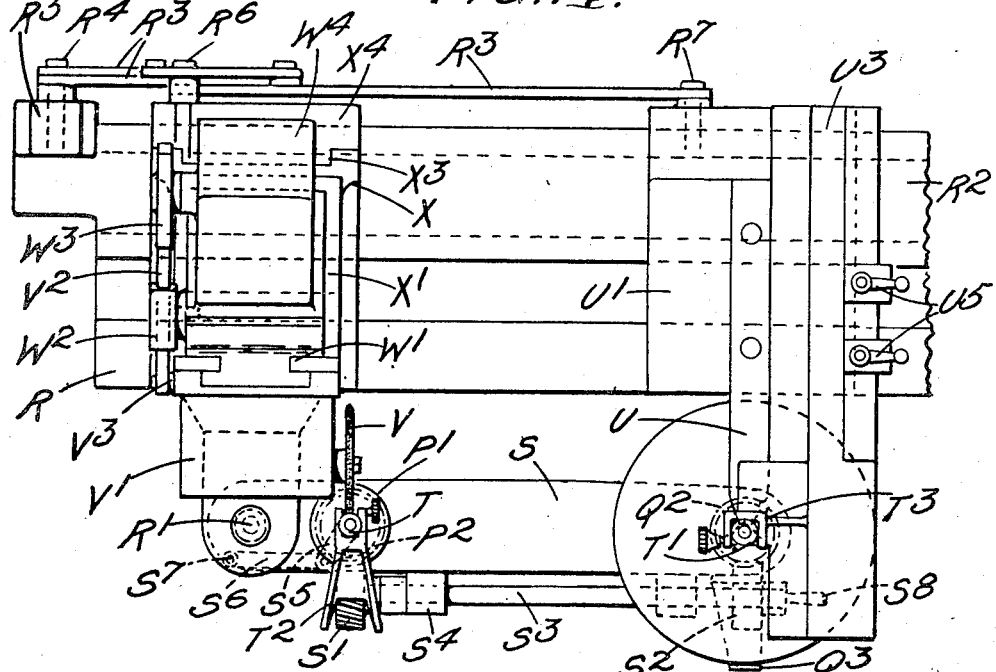

The invention may be carried into practice in various ways, but two alternative constructions of engraving machine according thereto are illustrated by way of example in the accompanying drawings, in which Figures 1 and 2 are respectively a plan and a front elevation of the first construction, Figure 3 is a section on the line 3—3 of Figure 2, Figure 4 is a somewhat diagrammatic plan view showing more particularly the gearing between the work and copy shafts, Figure 5 is a section on the line 5—5 of Figure 4, Figure 6 is a section on the line 6—6 of Figure 4 showing the mounting of the work shaft, Figure 7 is a sectional view showing the mounting of the copy shaft, Figure 8 is a plan (partly in section) showing the supporting table on the copy shaft, Figures 9 and 10 are respectively a plan and vertical section of the copy table with auxiliary link mechanism fitted thereon, Figures 11 and 12 are diagrams illustrating the use of the machine of Figures 1-10 for generating a circular arc on the work, and Figures 13, 14 and 15 are respectively a front elevation, a plan and a side elevation of the second construction.

In the first construction shown in Figures 1-10, the machine comprises a fixed base A from which brackets $A^1$ project near one end of the machine to carry pivot bearings for the primary link $B^1$ of a pantograph, the pivot axis being termed the "primary axis" and being indicated in chain line at B in Figure 2. The other three links $B^2$ $B^3$ $B^4$ of the pantograph are connected together in the well-known manner, the links $B^2$ and $B^3$ being pivoted to the link $B^1$ respectively on axes indicated at $B^5$ and $B^6$, whilst the link $B^4$ is pivoted to the links $B^2$ and $B^3$ respectively on axes $B^7$ and $B^8$, of which the former constitutes the work shaft axis, the axes $B^5$ $B^6$ $B^7$ $B^8$ being respectively at the four corners of a parallelogram. The copy shaft axis $B^9$ is in the link $B^3$ at such a position that the ratio between the distances of the axes $B^8$ and $B^9$ from the axis $B^6$ is equal to the ratio between the distances of the axes $B^5$ and $B^6$ from the primary axis B, thereby ensuring that the work and copy shaft axes $B^7$ and $B^9$ are coplanar with the primary axis B and that the ratio of their distances from the primary axis always remains constant. In the drawings the pantograph is shown in what may be termed a "zero" position.

front strike typewriting machine. It should be understood, however, that the invention may be incorporated in various styles of typewriting or like machines and is in no sense restricted to its use in the machine of the character shown.

In the present instance a series of segmentally arranged type bars 1 are mounted to move upwardly and rearwardly to printing position and to strike against the front face of the platen 2 mounted in a carriage (not shown) to travel from side to side of the machine over the top plate thereof. The type bars are mounted on a pivot wire 3 carried by a type bar segment 4, the heels of the type bars working in guide slots 5 which extend through the lower edge of the segment. The type bars as they approach the sides of the system are bent laterally at the end portions thereof as best shown in Fig. 10, the line of the bend in each bar being indicated at 6. From an inspection of Figs. 1 and 11 it will be understood that the body portions of the type bars converge at a point coincident with the lines 6 of the bends therein when the type bars are in printing position, the printing point 7 being above and not at the point of convergence of the bars. The construction is such therefore that end portions 8 of all of the type bars, which carry the type blocks 9, are adapted to be brought to the same vertical plane when the bars are in the printing position as will be understood from a consideration of Fig. 11. There is nothing unusual in this construction but it is pointed out in detail herein in order that there may be a better appreciation of what is to follow.

Any suitable means may be employed for actuating the type bars and for effecting a relative case shifting movement between the platen and type bars.

A center guide, which is designated as a whole by the reference numeral 10, is fixed in the path of all the type bars and co-acts therewith at the portion 8 of each bar which is beyond the line 6 thereof, or beyond that portion of the bar which is coincident with the point of convergence of the bars. Within the broader aspects of my invention this center guide may be variously formed, many widely divergent forms of construction having been devised by me but it will suffice to describe in detail the form shown in the accompanying drawings.

In the present instance roller guide surfaces which co-act with each type bar are formed on a single center guide roller, though from certain aspects of my invention it is not necessary that such surfaces be formed on a single guide roller.

The center guide roller is designated as a whole by the reference numeral 11, and is formed in the present instance with trunnion-like cone pivots 12 at the ends thereof. These pivots bear against the rounded corners 13 of bearings formed in two bracket-like supporting arms 14 and 15 between which the roller is received and by which it is supported horizontally in position. The axis of the roller therefore extends transversely of each type bar when the latter is in the printing position. The arms 14 and 15 constitute members of a two-part bearing or support, the members of which are united for relative adjustment and which are provided with means whereby the support in its turn may be rigidly connected to a relatively fixed support, such as the type bar segment 4. Thus, from an inspection of Figs. 4, 5 and 6 it will be seen that the member 15 has two semi-cylindrical bearing members 16 which are received in corresponding seats 17 in the member 14. This enables the member 15 to receive a slight swinging or pivotal movement on the member 14, the inner face of the part 15 being inclined in opposite directions, as indicated at 18, to facilitate such movement. The effect of this movement of the member 15 is to bring the upper ends of the two arms and the bearings 13 therein closer together or to move them further apart as the case may be. This relative adjustment between the bearing arms enables the roller to be properly maintained in its centered position, free from lost motion at the bearings and to take up any such lost motion which might occur as a result of wear on the bearings. Means for uniting the two members 14 and 15 and for effecting the above described adjustment will now be set forth.

A centrally disposed headed screw 19 extends through transverse openings 20 and 21 in the stems of the members 15 and 14 respectively. The axis of the screw 19 passes through the axis of the bearings 16 so as to enable an adjustment of the member 15 to be effected. It will be observed moreover that the walls of the opening 20 slope outwardly from the screw and from the inner face of the member 15, so that the screw 19 passes freely through the opening 20 and when backed up offers no obstruction to the above described adjustment of the member 15. The screw 19 passes transversely through the members 14 and 15 and centrally between the bearings 16 and seats 17 and is threaded into the opening 21 which is tapped to receive it. Above and below the screw 19 are screws 22 and 23 respectively. These last mentioned screws are received in tapped openings in the member 15 and bear at their inner ends against the inner face of the member 14, one above and the other below the pivotal axis of the member 15. When the screw 19 rotated synchronously, but when it is desired to maintain these shafts in a fixed orientation, they are first swung round to the desired angular position and the clamping nut $L^7$ is tightened onto the boss $L^6$.

For supporting the work itself, a table $H^1$ is attached to the top of the work shaft H, this table being surrounded by a splash guard $H^2$ which may be mounted on the link $B^4$ of the pantograph. The shaft H itself is mounted in bearings $H^3$ in a sleeve $H^4$ having at its upper end a conical face, against which the upper edge of the main tubular body of the pantograph link $B^2$ is pressed by tightening grub screws $H^6$ against inclined faces $H^7$ near the lower end of the sleeve $H^4$. This arrangement facilitates mounting of the various parts accurately in the desired relative positions.

The copy shaft J is similarly mounted in bearings in an intermediate sleeve $J^1$ secured to the pantograph link $B^3$, and carries at its upper end a copy table formed in two superimposed parts $J^2$ $J^3$, the lower part $J^3$ being attached to the shaft J whilst the upper part $J^2$ is normally secured to the lower part by means of T-bolts $J^4$ engaging in an annular groove $J^5$ in the part $J^3$. This arrangement permits the operative supporting part $J^2$ of the table to be adjusted, if desired, at a measured angle relatively to the part $J^3$ and therefore also relatively to the work table $H^1$, a vernier scale being provided at the edges of the two parts.

In order to control the rotation of the copy and work tables relatively to the pantograph, a handwheel M is provided in a casing $M^1$ carried by the sleeve $J^1$ connected to the pantograph link $B^3$, the handwheel spindle $M^2$ carrying a worm $M^3$ engaging with a worm wheel $J^6$ fixed to the lower part $J^3$ of the copy table. The handwheel spindle is located eccentrically in a bushing $M^4$, which can be rotated in the casing $M^1$ by means of a handle $M^5$, thus permitting the worm $M^3$ to be thrown into or out of engagement with the worm wheel $J^6$ by operation of the handle $M^5$. The bushing $M^4$ can be clamped in either position by means of a pair of clamping blocks $M^6$ operated by a locking handle $M^7$.

The machine as described above may be utilised for grinding a work blank mounted on the work table $H^1$ in accordance with the profile of a template mounted on the copy table $J^2$, by so operating the pantograph that the operative point of the fixed tracer C is caused to traverse the peripheral edge of the template, the work and copy tables meanwhile being synchronously rotated as may be necessary to maintain the tracer point in contact with the edge of the template and at an angle thereto suitable for grinding. The grinding wheel D will thus be caused to move around the work blank, grinding it to the required shape, the reciprocating movement of the grinding wheel enabling it to cover the thickness of the work blank. As explained above a front rake may be imparted to the work by swivelling the slideway $E^6$ through the appropriate angle.

If desired, the template may be replaced by an accurate drawing or a scribing in outline on sheet metal secured on the copy table $J^2$, the tracer point then following such drawing instead of the edge of the template. In such a case, since there is no solid abutment for the tracer, it may be desirable to clamp the pantograph and likewise to tighten up the clamping nut $L^7$ of the orienting mechanism before taking a cut when the tracer point has been accurately located above a point of the drawing, the operation being repeated at each successive point of the drawing until the entire outline has been reproduced. The microscope G, fixed in a position in which its optical axis passes through the tracer point in the primary plane, may be utilised for ensuring exact setting of the tracer point against the outline of the drawing.

The machine can also be utilised for grinding the work to a desired profile in accordance with basic measurements without employing any copy, template, model or drawing, and for this purpose the microscope G is provided with a special mounting, by means of which it can be adjusted relatively to the tracer point. This mounting is shown in Figures 1 and 2 and will now be described. The microscope G is secured in a convenient position on a slide $G^1$, which can slide in a direction at right angles to the primary plane along a slideway $G^2$, clamps $G^3$ being provided to enable the slide to be securely clamped to the slideway in any desired position of adjustment thereon. The slide and slideway carry vernier scales $G^4$, by means of which the distance of the optical axis of the microscope G from the primary plane can be accurately measured. The slideway $G^2$ is itself carried by a slide $G^5$, which can slide in a direction parallel to the primary plane along a fixed slideway $A^3$ projecting upwardly behind the fixed slideway $A^2$ on which the tracer bracket is secured. The slide $G^5$ can be securely clamped to the slideway $A^3$ in any desired position by means of clamps $G^6$, and vernier scales $G^7$ are provided for accurately measuring the distance of the optical axis of the microscope G from a plane perpendicular to the primary plane through the tracer point. It will be clear that this mounting enables the microscope G to be located in any chosen position relative to the tracer point determined by two coordinate measurements respectively parallel and perpendicular to the primary plane. A V-shaped slot $G^8$ is mounted on the slide $G^1$ immediately beneath the microscope G for holding a pivot pin with its pivot axis coincident with the optical axis of the microscope, this pivot pin being clamped to the copy table $J^2$ by means of the auxiliary mechanism shown in Figures 9 and 10.

This auxiliary mechanism comprises a pair of slide links $N^1$ $N^2$, of which the former $N^1$ carries the pivot pin N at its free end, the upper end surface of the pivot pin preferably being provided with crossed-line markings on which the microscope can be sighted. The two slide links $N^1$ and $N^2$ are pivoted together at $N^3$. Each link has a slot $N^4$ through which passes a bolt $N^5$ carrying a slide block $N^6$ engaging in a widened lower part $N^7$ of the slot $N^4$, the bolt engaging in a bracket $N^8$ which also carries guide screws $N^9$ engaging with the side edges of the slide link. Each bracket $N^8$ is pivoted to the copy table $J^2$ by means of a T-bolt $N^{10}$ which can be clamped in any of the clamping slots $J^7$ provided in the copy table for securing the copy or template thereto. Thus by clamping the pivot bolts $N^{10}$ in suitable positions on the copy table, and by swinging the brackets $N^8$ and sliding the slide links $N^1$ $N^2$ over them, the pivot pin N can be brought into any chosen position on the copy table and can be securely clamped in such position by tightening the bolts $N^5$.

The method of utilizing this mechanism for the purpose of generating a circular arc on the work will now be described with reference to Figures 11 and 12. First of all it is necessary to locate the work and copy shaft axes accurately in their zero positions in the primary plane in which they pass through the operative points of the tool and tracer. For this purpose the slides $G^1$ $G^5$ are located in the positions at which their vernier scales $G^4$ $G^7$ read zero, and the pivot pin N or preferably another pin $N^{11}$ located centrally on the copy table is brought into engagement with a V-slot $C^2$ carried by the tracer bracket $C^1$ in place of the tracer, the microscope G being sighted on the pin $N^{11}$ to ensure accuracy in the adjustment. It is also necessary to rotate the work and copy shafts to bring datum axes $H^8$ and $J^8$ (indicated by chain lines in Figure 11) on the tables into the primary plane. This can be effected by adjusting the slide links $N^1$ $N^2$ to bring the pivot pin N to a position on the radius of the copy table which constitutes the datum axis thereon, or by providing some other sighting mark on such radius, and moving the slide $G^5$ along its slideway to enable the microscope to be sighted on the pivot pin or sighting mark when the copy table has been turned to bring the datum axis $J^8$ into the primary plane. The orienting mechanism is then clamped in such zero position, and the pantograph is also held in the zero position, preferably by means of a weighted or spring loaded hook for pulling the central pin $N^{11}$ on the copy table into engagement in the V-slot $C^2$ on the tracer bracket. A suitable construction is shown on Fig. 11. A hook $N^{12}$ is provided on the part $N^{11}$ and a similar hook $N^{13}$ on the part N. A Bowden wire $N^{14}$, which can be attached at will to either of these hooks, passes around three pulleys $N^{15}$, one arranged horizontally and two vertically, and supports a weight $N^{16}$. The pulleys are mounted on the supporting column carrying the slides $G^1$ and $G^5$.

The microscope is now moved, by adjusting both slides $G^1$ and $G^5$ through the desired distances as indicated by their vernier scales, until it occupies the position on the copy table which corresponds to the centre of the circular arc it is desired to generate, and the two slide links $N^1$ $N^2$ are again adjusted to bring the pivot pin N exactly into position beneath the mocroscope and are securely clamped in such positions. Figure 11 shows the parts in this position. The slide $G^5$ is now brought back to and clamped in its zero position and the slide $G^1$ is moved to and clamped in a position in which its vernier scale indicates that the microscope is at a distance from the tracer point corresponding to the radius of the desired circular arc, the microscope being behind the primary plane if the arc is concave and in front of the primary plane if the arc is convex.

The pantograph and orienting mechanism are now released and the pantograph is moved to bring the pin N, now clamped in the position on the copy table corresponding to the center of the desired arc, into engagement in the V-slot $G^8$, as shown in Figure 12, so that it is at a distance from the tracer point equal to the radius of the arc. When the grinding wheel has been set in its correct position as determined by the work microscope F, the grinding operation can be carried out, with the pin N held in engagement in the V-slot $G^8$, so that the pin is held fixed in space during the pantograph movement thereby causing the tracer point in effect to follow a circular path on the copy table about the pin, the grinding wheel correspondingly grinding the desired circular arc on the work.

It will be appreciated that polar coordinates may be employed instead of rectangular coordinates for locating the pivot pin N in position, relative rotation of the two parts $J^2$ $J^3$ of the copy table being utilized for the angular coordinate measurement The same mechanism can be used for generating a straight line on the work. For this purpose it is first of all necessary to locate the work and copy shaft axes with the datum axes $H^8$ and $J^8$ on the tables accurately in their zero positions, in the manner above described for circular arc grinding, the pantograph and orienting mechanism being clamped to hold the parts in such zero positions. The upper part $J^2$ of the copy table is now released from the lower part $J^3$ and swung round relatively thereto in the appropriate direction through an angle equal to that between the desired straight line and the datum axis. The two parts of the copy table are clamped together in this position and the orienting mechanism readjusted to clamp the datum axis $J^8$ on the copy table in position in the primary plane, so that the datum axis $H^8$ on the work table lies at the desired angle to the primary plane. The slide $G^1$ is now moved and clamped in a position in which the microscope is at the distance from the primary plane, appropriate to the position of the desired straight line on the work. For effecting the desired grinding the orienting mechanism is held clamped and the slide $G^5$ is moved along its slideway, the central pin $N^{11}$ on the copy table being held in engagement in the V-slot $G^8$.

It will be appreciated that with these methods of generating circular arcs and straight lines on the work from basic measurements, a very high degree of accuracy can be obtained, since they eliminate risk of error due to any inaccuracies there might be in the copy or template or drawing, and moreover they make use not only of the normal mechanical magnification of the pantograph ratio (which may for example be five to one) but also of the optical magnification involved in the microscope checking, the measurements themselves being made with the high dgree of accuracy associated with vernier scales. If desired, further microscopes may be used for checking the settings of these scales.

It is not always essential that there should be exact correspondence in form between the grinding wheel and tracer profiles, and indeed it is often preferable to depart from true correspondence. Thus with a grinding wheel of V-section having a radiused edge, it is advantageous to have accurate correspondence in form only at the operative circular edges, the flanks of the tracer profile being more obtuse than those of the grinding wheel in order to prevent the wheel flanks from coming in contact with the work.

In the foregoing construction the synchronously rotatab'e work and copy shafts are movable in space under the control of a pantograph, whilst the tool and tracer have fixed operative positions. It is to be understood, however, that the invention is not limited to such an arrangement and is applicable to a variety of alternative arrangements of the supports for the four elements. Thus for instance the work and copy shafts may be mounted in bearings in a lever arm at fixed distances from the primary axis, about which the arm is pivoted, whilst the tool and tracer are mounted to slide in a fixed plane containing the primary axis, their distances therefrom being maintained proportional to the corresponding distances for the work and copy shafts. Alternatively these arrangements may be inverted, with the work and copy shaft axes movable in the fixed plane and the tool and tracer fixed on the lever arm, or with the work and copy shaft axes fixed and the tool and tracer carried by the pantograph.

In all such arrangements it is usually preferable for the operative points of the tool and tracer to lie in one plane with the primary axis, whilst the work and copy shaft axes also lie in one plane with such axis, the two planes being relatively movable. This, however, is not essential in all cases, and there may be two planes through the primary axis respectively containing the operative points of the tool and tracer, the angle between such planes being equal to the angle subtended at the primary axis by the work and copy shaft axes.

As an example of such variants, Figures 13–15 show somewhat diagrammatically a construction of machine in which the tool and tracer can slide along the primary plane, whilst the work and copy shafts are carried by a lever arm pivoted about the primary axis.

In this construction the work shaft P carrying the work table $P^1$ and the copy shaft Q carrying the copy table $Q^1$ are mounted in bearings in a lever arm S pivoted about the primary axis $R^1$ in bearings in the fixed base R of the machine. At their lower ends the work and copy shafts carry helical gear wheels $P^2$ and $Q^2$ engaging respectively with helical gear wheels $S^1$ and $S^2$ mounted on a shaft $S^3$ carried in bearings $S^4$ by the lever arm S, whereby the rotational movements of the work and copy tables are maintained in strict synchronism with one another. In order to hold the work and copy tables in a fixed orientation during movement of the lever arm S, an arm $S^5$ (which can be clamped to the work shaft P by means of a clamping nut similar to the nut $L^7$ in the first construction) is pivotally connected at its free end to a link $S^6$ pivoted to the base R of the machine at a point $S^7$ at a distance from the primary axis $R^1$ equal to the length of the arm $S^5$, the length of the link $S^6$ being equal to the distance between the primary axis and the work shaft axis so as to form in effect a parallelogram linkage. A handle $S^8$ is provided for rotating the shaft $S^3$ and the work and copy tables.

Two microscopes T and $T^1$ are provided for ensuring accurate relative adjustment of the parts of the machine. The microscope T is mounted on a bracket $T^2$ carried by the lever arm S so that its optical axis is coincident with the work shaft axis. The manner in which the second microscope $T^1$ is mounted will be described below.

The traver U is carried by a support $U^1$ which can slide along a slideway $R^2$ on the base R of the machine, the arrangement being such that as the support $U^1$ moves along the slideway the operative point of the tracer moves in the primary plane through the primary axis $R^1$. The drawings show the lever arm S in its zero position in which the work and copy shaft axes lie in the primary plane, the tracer support also being in its zero position in which its operative point lies at the zero position of the copy shaft axis.

The tracer support $U^1$ is provided with a slideway $U^2$ which extends at right angles to the primary plane and on which a member $U^3$ can slide. This slide member $U^3$ carries a bracket $T^3$ on which the second microscope $T^1$ is mounted and also a V-groove $U^4$ beneath the microscope.

Cooperating vernier scales are provided on the slideway $U^2$ and slide member $U^3$, and clamps $U^5$ serve to clamp the slide member to the slideway in any desired position of adjustment.

The grinding wheel V is driven by mechanism contained within a casing $V^1$, which is reciprocated up and down on a slideway $W^1$ on a bracket W by means of a lever $V^2$ which is pivoted to the casing $V^1$ at $V^3$ and can slide in a block $W^2$ pivoted to the bracket W, and whose free end is engaged by a cam $W^3$ driven through gearing by an electric motor $W^4$ carried by the bracket W. The bracket W is adjustable transversely to the primary plane on a slideway $X^1$ on a member X under the control of a handwheel $X^2$, the member X being mounted on an arcuate guide $X^3$ on a support $X^4$ so that it can be swivelled about the operative point of the grinding wheel V in the primary plane to vary the direction of reciprocation of the wheel. The support $X^4$ can slide parallel to the primary plane along the fixed slideway $R^2$.

Suitable mechanism is provided to ensure that the ratio of the distances of the operative points of the tracer and grinding wheel from the primary axis is always maintained equal to the ratio of the distances of the copy and work shaft axes from the primary axis. In the example illustrated, this mechanism is in the form of a vertically mounted pantograph $R^3$ pivoted at $R^4$ to a fixed bracket $R^5$ and also at $R^6$ and $R^7$ respectively to the supports $X^4$ and $U^1$ carrying the grinding wheel and the tracer.

In operation for grinding a work blank mounted on the work table $P^1$ in accordance with the profile of a template or copy mounted on the copy table $Q^1$, the lever arm S is swung about the primary axis $R^1$ and the supports $X^4$ and $U^1$ are moved along the slideway $R^2$ in such a manner as to cause the operative point of the tracer U to traverse the surface of the template or copy, the work and copy tables being synchronously rotated as required. The grinding wheel V is simultaneously rotated and reciprocated to effect the desired grinding, the member X being swivelled, if desired, to impart a front rake to the work. For grinding in accordance with a drawing on the copy table, it may be desirable to clamp the lever arm S and the pantograph $R^3$ and to tighten up the clamping nut of the orienting mechanism $S^5$ $S^6$ before taking a cut in each position of the tracer point on the drawing.

The microscopes T $T^1$ are employed in a manner similar to that described for the first construction for ensuring accuracy in adjustment of the grinding wheel and tracer relatively to the work and copy tables.

The machine is also readily adaptable to grinding straight lines from basic measurements for which purpose the lever arm S is first brought into its zero position (the adjustment being checked by the microscope $T^1$), and the work and copy tables $P^1$ $Q^1$ are rotated until a datum axis on the copy table, whose normal zero position is in the primary plane, makes an angle with the primary plane equal to the inclination of the straight line to be ground, cooperating vernier scales $Q^3$ being provided on the copy table and the lever arm for this purpose. The orienting mechanism $S^5$ $S^6$ is then clamped to hold the two tables in this orientation. The lever arm S is then swung from its zero position through an angle such as to bring the copy shaft axis the requisite distance from the primary plane, this distance being measured by means of the vernier scales on the slideway U² and slide member U, the microscope T¹ being sighted on a suitable mark on the copy table at the axis thereof. When the lever arm has been clamped in this position of adjustment, the desired grinding can be effected by sliding the support X⁴ along the fixed slideway R².

For circular arc grinding, the point on the copy table Q¹ corresponding to the centre of the desired arc can be determined by polar coordinates, the lever arm S having first been brought to its zero position, by rotating the copy table until its datum axis makes with the primary plane an angle equal to the angular coordinate and by sliding the tracer support U¹ along the slideway R² through a distance from its zero position equal to the radial coordinate, cooperating vernier scales being provided on the tracer support and the slideway. A pivot pin (not shown) is then clamped on the copy table at the point so determined by means of slotted links similar to those shown in Figures 9 and 10. For locating such pivot pin at the requisite distance (corresponding to the radius of the desired arc) from the operative point of the tracer, the slideway U² and slide member U³ are used, the pivot pin being engaged in the V-groove U⁴. This arrangement is closely analogous to the corresponding arrangement described above with reference to the first construction, and will be clear without further description.

The foregoing constructions have been described with reference to the use of the machine for grinding the work blank by means of an abrasive wheel. It will be appreciated, however, that the machine can be employed for other purposes with the use of other tools, as for example milling cutters, with appropriate arrangement of the driving mechanism for the tool. Thus for instance when the tool is an end mill, it may be arranged with its axis parallel to the primary axis.

The mounting of the microscopes may also be varied, for example to suit the nature of the tool used, and the machine may be provided with a number of microscope mountings, in which the microscopes may be inserted as required. Such mountings may be provided not only in the positions above mentioned, but also for example adjacent to the vernier scales to ensure greater accuracy in adjustment thereof. The microscopes may also be replaced by other forms of sighting or magnifying device, as for example simple fore and back sights or an optical system for projecting an enlarged image on to a screen.

While for convenience the machine will usually have its primary axis vertical, this is not essential to the invention, and in some instances it may be preferable to depart from such arrangement, as for example when machining the interior of a mould where the vertical arrangement might give trouble owing to the accumulation of chips in the mould.

In the constructions above described the copy table is more distant from the primary axis than the work table, these constructions being intended for reproduction on a reduced scale, but it will be clear that the converse arrangement may also be used, and in some instances even the work and copy shafts may be coaxial giving a one to one ratio of reproduction. For the majority of purposes it will suffice to provide for reproduction on a fixed reduced scale, say five to one, but the machine may be such that the scale may be varied to suit particular requirements, for example by employing a pantograph whose operative ratio can be adjusted or in other ways in accordance with the type of machine.

Although the machine has been described solely with reference to movements in two dimensions (except in so far as provision is made for oblique grinding or cutting to impart a rake to the work), it will be appreciated that it can in some instances be adapted for three-dimensional work by applying the invention to a machine of the kind forming the subject of British Patent No. 418,135, standing in the names of one of the present applicants and another.

It will be appreciated that the two constructions and the various modifications thereof described above have been given by way of example only and that the invention can be carried into practice in other ways. Moreover the synchronous gearing between the work and copy shafts shown in Figures 4–6, although described solely with reference to its use in the engraving machine, may be applied generally to any form of mechanism employing two relatively movable parallel shafts for maintaining exact synchronism between their rotational movements.

What we claim as our invention and desire to secure by Letters Patent is:—

1. An engraving machine or the like including in combination a tool support, a work support, a tracer support, a copy support, such supports being relatively movable, means for mechanically interconnecting the four supports in such a manner that during normal operation of the machine the geometrical relationship (at least in two dimensions) between the tool and work supports or the elements carried thereon is maintained in strict ratio to that between the tracer and copy supports or elements carried thereon, and means whereby the tool can be constrained to generate a circular arc on the work comprising a member associated with the tracer support, means for maintaining a pivot axis in such member at a distance from a datum point or origin on the tracer support proportional to the radius of the desired circular arc, and means for holding such member in pivotal engagement with the copy support with the pivot axis therein at a position on the copy support corresponding to the centre of the desired circular arc.

2. The combination with the features set forth in claim 1, of two mutually perpendicular slideways by means of which the pivot axis in the member associated with the tracer support is located at the correct distance from the tracer support origin by coordinate measurement.

3. The combination with the features set forth in claim 1, of a magnifying device for ensuring that the pivot axis in the member associated with the tracer support is accurately located at the desired position on the copy support.

4. The combination with the features set forth in claim 1, of means for ensuring that the pivot axis in the member associated with the tracer support is accurately located at the desired position on the copy support, such means comprising a microscope mounted on the member and having its optical axis coincident with the pivot axis therein.

5. An engraving machine or the like including in combination a tool support, a work support, a tracer support, a copy support, such supports being relatively movable, means for mechanically interconnecting the four supports in such a manner that during normal operation of the machine the geometrical relationship (at least in two dimensions) between the tool and work supports or the elements carried thereon is maintained in strict ratio to that between the tracer and copy supports or elements carried thereon, means for constraining the tool and tracer supports so that datum points or origins thereon have operative positions in a fixed primary plane containing a primary axis, means whereby the work and copy supports can be synchronously rotated about axes which remain parallel to and coplanar with the primary axis but can move in space relatively to the primary plane, a member associated with the tracer support, means for adjusting such member to a position in which a pivot axis therein is at a measured distance from the tracer support origin, means for clamping the said member to the tracer support in such position, a second member associated with the copy support, means for adjusting such member to a position in which a pivot axis therein is at measured distances from coordinate datum axes on the copy support, means for clamping the second member to the copy support in such position, and means for holding the two members in pivotal engagement with one another with their pivot axes coincident, whereby the tool can be constrained to generate a circular arc on the work.

6. An engraving machine or the like including in combination a tool support, a work support, a tracer support, a copy support, such supports being relatively movable, means for mechanically interconnecting the four supports in such a manner that during normal operation of the machine the geometrical relationship (at least in two dimensions) between the tool and work supports or the elements carried thereon is maintained in strict ratio to that between the tracer and copy supports or elements carried thereon, means for constraining the tool and tracer supports so that datum points or origins thereon have operative positions in a fixed primary plane containing a primary axis, means whereby the work and copy supports can be synchronously rotated about axes which remain parallel to and coplanar with the primary axis but can move in space relatively to the primary plane, a slideway parallel to the primary plane, a second slideway perpendicular to the first slideway and adjustable along it, means for clamping the second slideway to the first at a measured distance from the tracer support origin, a member adjustable along the second slideway, means for clamping such member to the second slideway in a position at which a pivot axis therein is at a measured distance from the primary plane, a second member associated with the copy support, means for adjusting such member to a position in which a pivot axis therein is at measured distances from coordinate datum axes on the copy support, means for clamping the second member to the copy support in such position, and means for holding the two members in pivotal engagement with one another with their pivot axes coincident, whereby the tool can be constrained to generate a circular arc on the work.

7. The combination with the features set forth in claim 6, of means for holding the copy support in a zero position with its datum axes respectively parallel to and perpendicular to the primary plane, whereby the two slideways can be utilized also for locating the pivot axis in the second member at the correct distances from such datum axes.

8. An engraving machine or the like including in combination a tool support and a tracer support respectively having datum points or origins normally occupying fixed operative positions in a primary plane containing a primary axis, a work support, a copy support, means for synchronously rotating the work and copy supports about axes which remain parallel to and coplanar with the primary axis but can move relatively to the primary plane, means such as a pantograph for controlling the movements of the work and copy support axes in such a manner that the ratio of their distances from the primary axis is maintained equal to the ratio of the distances of the tool and tracer support origins from such axis, and means whereby the tool can be constrained to generate a circular arc on the work comprising a member associated with the tracer support, means for maintaining a pivot axis in such member at a distance from the tracer support origin proportional to the radius of the desired circular arc, and means for holding such member in pivotal engagement with the copy support with the pivot axis therein at a position on the copy support corresponding to the centre of the desired circular arc.

9. The combination with the features set forth in claim 8, of means for locating the member associated with the tracer support with its pivot axis at the desired distance from the tracer support origin, comprising a slideway parallel to the primary plane, a second slideway perpendicular to and adjustable along the first slideway and having the said member adjustable along it, means for clamping the second slideway to the first at a measured distance from the tracer support origin, and means for clamping the member to the second slideway in a position at which its pivot axis is at a measured distance from the primary plane.

10. An engraving machine or the like including in combination a tool support and a tracer support respectively having datum points or origins normally occupying fixed operative positions in a primary plane containing a primary axis, a work support, a copy support, means for synchronously rotating the work and copy supports about axes which remain parallel to and coplanar with the primary axis but can move relatively to the primary plane, means such as a pantograph for controlling the movements of the work and copy support axes in such a manner that the ratio of their distances from the primary axis is maintained equal to the ratio of the distances of the tool and tracer support origins from such axis, a slideway parallel to the primary plane, a second slideway perpendicular to and adjustable along the first slideway, means for clamping the second slideway to the first at a measured distance from the tracer support origin, a member adjustable along the second slideway, means for clamping such member to the second slideway in a position at which a pivot axis therein is at a measured distance from the primary plane, means for holding the copy support in a zero position with its axis of rotation passing through the tracer support origin and with a datum axis on it parallel to the primary plane, a second member which can be adjusted with the aid of the two slideways to a position on the copy support at which a pivot axis in the member is at measured coordinate distances from the axis of rotation and the datum axis on the copy support, means for clamping the second member to the copy support in such position of adjustment, a microscope mounted on the first member with its optical axis coincident with the pivot axis therein for ensuring that the copy support is accurately located in its zero position and that the pivot axis in the second member is accurately located in the correct position of adjustment on the copy support, and means for holding the two members in pivotal engagement with one another with their pivot axes coincident, whereby the tool can be constrained to generate a circular arc on the work.

11. An engraving machine or the like including in combination a tool support, a tracer support, a fixed slideway along which such supports can slide so that datum points or origins on the supports have variable normal operative positions in a primary plane parallel to the slideway, means for maintaining constant the ratio between the distances of the tool and tracer support origins from a primary axis in the primary plane, an arm pivoted about such primary axis, a work support and a copy support rotatably carried by such arm with their axes parallel to and coplanar with the primary axis and with the ratio between the distances of such axes from the primary axis equal to the ratio of the distances of the tool and tracer support origins therefrom, means for synchronously rotating the work and copy supports about their axes, and means whereby the tool can be constrained to generate a circular arc on the work comprising a member associated with the tracer support, means for maintaining a pivot axis in such member at a distance from the tracer support origin proportional to the radius of the desired circular arc, and means for holding such member in pivotal engagement with the copy support with the pivot axis therein at a position on the copy support corresponding to the centre of the desired circular arc.

12. The combination with the features set forth in claim 11, of means for locating the member associated with the tracer support with its pivot axis at the desired distance from the tracer support origin, comprising a second slideway on the tracer support perpendicular to the fixed slideway and having the said member adjustable along it, means for clamping the member to the second slideway in a position at which its pivot axis is at a measured distance from the tracer support origin.

13. The combination with the features set forth in claim 11, of means for holding the tracer support and the copy support in a zero position in which the axis of rotation of the copy support passes through the tracer support origin and a datum axis on the copy support lies parallel to the primary plane, a second member which can be adjusted to bring a pivot axis therein to the position on the copy support corresponding to the centre of the desired arc by sliding the tracer support along the fixed slideway through a measured distance from the zero position and rotating the copy support through a measured angle from the zero position, means for clamping the second member to the copy support in such position of adjustment, and a microscope mounted on the first member with its optical axis coincident with the pivot axis therein for ensuring that the copy and tracer supports are accurately located in the zero position and that the pivot axis in the second member is accurately located in the correct position of adjustment on the copy support, the two members being held in pivotal engagement with one another with their pivot axes coincident for generating the desired circular arc.

14. An engraving machine or the like as claimed in claim 5, in which the means for clamping the second member to the copy support in the chosen position of adjustment thereon comprises two pivots mounted at fixed points on the copy support, two links respectively rotatable about such pivots and capable of sliding over the pivots the links carrying the second member at their point of intersection, and means for clamping the links to their pivots in any desired angular positions thereon.

15. An engraving machine or the like as claimed in claim 10, in which the means for clamping the second member to the copy support in the chosen position of adjustment thereon comprises two pivots mounted at fixed points on the copy support, two links respectively rotatable about such pivots and capable of sliding over the pivots the links carrying the second member at their point of intersection, and means for clamping the links to their pivots in any desired angular positions thereon.

16. An engraving machine or the like including in combination a tool support and a tracer support respectively having datum points or origins normally occupying operative positions in a primary plane at fixed distances from a fixed primary axis in such plane, a work support, a copy support, means for synchronously rotating the work and copy supports about axes which remain parallel to the primary axis but can move in a secondary plane containing such axis, the primary and secondary planes being relatively movable about the primary axis, means for controlling the movements of the work and copy support axes in such a manner that the ratio of their distances from the primary axis is maintained equal to the ratio of the distances of the tool and tracer support origins from such axis, orienting means for holding the work and copy supports during the movements of their axes in the secondary plane in such a manner that datum axes thereon can be maintained at any chosen angle to the primary plane, and means for maintaining the axis of rotation of the copy support at a measured distance from the primary plane, whereby the tool can be constrained to generate on the work a straight line at the chosen angle to the datum axis on the work support.

17. An engraving machine or the like including in combination a tool support and a tracer support respectively having datum points or origins normally occupying operative positions in a primary plane at fixed distances from a fixed primary axis in such plane, a work support, a copy support, means for synchronously rotating the work and copy supports about axes which remain parallel to the primary axis but can move in a secondary plane containing such axis, the primary and secondary planes being relatively movable about the primary axis, means for controlling the movements of the work and copy support axes in such a manner that the ratio of their distances from the primary axis is maintained equal to the ratio of the distances of the tool and tracer support origins from such axis, orienting means for holding the work and copy supports during the movements of their axes in the secondary plane in such a manner that datum axes thereon can be maintained at any chosen angle to the primary plane, a slideway parallel to the primary plane, a second slideway perpendicular to the first and slidable along it, a member adjustable along the second slideway, means for clamping such member to the second slideway in a position at which a datum point on the member is at a measured distance from the primary plane, and means for holding such member in engagement with the copy support with its datum point at the axis thereof, whereby by sliding the second slideway along the first the tool can be constrained to generate on the work a straight line at the chosen angle to the datum axis on the work support.

18. The combination with the features set forth in claim 16, of a magnifying device for ensuring that the axis of rotation of the copy support is accurately located at the measured distance from the primary plane.

19. The combination with the features set forth in claim 17, of a microscope carried by the member adjustable along the second slideway with its optical axis passing through the datum point on such member, for ensuring that the datum point is accurately located at the copy support axis.

20. An engraving machine or the like including in combination a tool support and a tracer support respectively having datum points or origins normally occupying fixed operative positions in a primary plane containing a primary axis, a work support, a copy support, means for synchronously rotating the work and copy supports about axes which remain parallel to and coplanar with the primary axis but can move relatively to the primary plane, means such as a pantograph for controlling the movements of work and copy support axes in such a manner that the ratio of their distances from the primary axis is maintained equal to the ratio of the distances of the tool and tracer support origins from such axis, means for locating the copy support in a zero position with its axis of rotation passing through the tracer support origin and with a datum axis on it parallel to the primary plane, a member rotationally adjustable about the axis of rotation of the copy support and having a datum axis normally coinciding with the datum axis on such support, means for clamping such member to the copy support with its datum axis at any chosen angle to the datum axis on such support, orienting means for holding the copy support during the movement of its axis of rotation in such a manner that the datum axis on the member is maintained parallel to the primary plane, and means for maintaining the axis of rotation of the copy support at a measured distance from the primary plane.

21. An engraving machine or the like as claimed in claim 16, in which the orienting means comprises a duplex parallelogram linkage.

22. An engraving machine or the like as claimed in claim 20, in which the orienting means comprises a duplex parallelogram linkage.

23. An engraving machine or the like as claimed in claim 8, in which the means for holding the copy support in its zero position comprises orienting means which can be utilised for maintaining the datum axis on such support at any chosen angle to the primary plane during movement of the axis of rotation of the support.

24. An engraving machine or the like including in combination a tool support and a tracer support respectively having datum points or origins normally occupying operative positions in a primary plane containing a fixed primary axis, a work support, a copy support, means for synchronously rotating the work and copy supports about axes which remain parallel to the primary axis but can move in a secondary plane containing such axis, the primary and secondary planes being relatively movable about the primary axis, means for controlling the relative movements of the four supports in such a manner that the ratio of the distances of the work and copy support axes from the primary axis is maintained equal to the ratio of the distances of the tool and tracer support origins from such axis, and orienting means for holding the work and copy supports during the movements of their axes in such a manner that datum axes on such supports can be maintained at any chosen angle to the primary plane.

25. An engraving machine or the like including in combination a tool support and a tracer support respectively having datum points or origins normally occupying fixed operative positions in a primary plane containing a primary axis, a work support, a copy support, means for synchronously rotating the work and copy supports about axes which remain parallel to and coplanar with the primary axis but can move relatively to the primary plane, means such as a pantograph for controlling the movements of the work and copy support axes in such a manner that the ratio of their distances from the primary axis is maintained equal to the ratio of the distances of the tool and tracer support origins from such axis, and orienting means comprising a duplex parallelogram linkage for maintaining a datum axis on the copy support at any chosen angle to the primary plane during movement of the axis of rotation of such support.

26. An engraving machine or the like as claimed in claim 16, in which the orienting means comprises a link pivoted about the primary axis, a second link pivoted at one end to the first link and at the other end about the axis of one of the two synchronously rotatable supports, a radius arm extending from such support axis, a fixed pivot member in the neighbourhood of the primary axis, a parallelogram linkage including the first link and having one corner at the fixed pivot member, a second parallelogram linkage including the second link and the radius arm, means for interconnecting the two parallelogram linkages in such a manner as to maintain the radius arm in a fixed orientation relatively to the line joining the primary axis and the fixed pivot member, and means for clamping the radius arm to the associated rotatable support in any chosen angular position relative thereto.

27. An engraving machine or the like as claimed in claim 25, in which the orienting means comprises a link pivoted about the primary axis, a second link pivoted at one end to the first link and at the other end about the axis of one of the two synchronously rotatable supports, a radius arm extending from such support axis, a fixed pivot member in the neighbourhood of the primary axis, a parallelogram linkage including the first link and having one corner at the fixed pivot member, a second parallelogram linkage including the second link and the radius arm, means for interconnecting the two parallelogram linkages in such a manner as to maintain the radium arm in a fixed orientation relatively to the line joining the primary axis and the fixed pivot member, and means for clamping the radius arm to the associated rotatable support in any chosen angular position relative thereto.

28. An engraving machine or the like including in combination a tool support and a tracer support respectively having datum points or origins normally occupying operative positions in a primary plane containing a fixed primary axis, a rotatable work support, a rotatable copy support, bearings for such supports which can move relatively to the tool and tracer supports in such a manner that the two axes of rotation always remain parallel to the primary axis and in a secondary plane containing such axis, the primary and secondary planes being relatively movable about the primary axis, means for controlling the relative movements of the four supports in such a manner that the ratio of the distances of the work and copy support axes from the primary axis is maintained equal to the ratio of the distances of the tool and tracer support origins from such axis, and means for maintaining exact synchronism between the rotations of the work and copy supports during the movements of their axes comprising a plurality of links pivoted to one another in chain formation connecting the bearings for the two supports, a main gear wheel on each of such supports, a further main gear wheel at each pivot point in the chain of links, and idler gear wheels interconnecting the main gear wheels in chain formation, all the main gear wheels being of the same size and being interconnected with one another at unity gear ratio.

29. An engraving machine or the like including in combination a tool support and a tracer support respectively having datum points or origins normally occupying operative positions in a primary plane containing a fixed primary axis, a rotatable work support, a rotatable copy support, bearings for such supports which can move relatively to the tool and tracer supports in such a manner that the two axes of rotation always remain parallel to the primary axis and in a secondary plane containing such axis, the primary and secondary planes being relatively movable about the primary axis, means for controlling the relative movements of the four supports in such a manner that the ratio of the distances of the work and copy support axes from the primary axis is maintained equal to the ratio of the distances of the tool and tracer support origins from such axis, and means for maintaining exact synchronism between the rotations of the work and copy supports during the movements of their axes comprising two links pivoted to one another and connected respectively to the bearings for the two supports, a main gear wheel on each of such supports, a further main gear wheel at the pivot point between the two links, and an idler gear wheel journalled on each link and meshing with the two main gear wheels associated with the link, the three main gear wheels all being of the same size.

30. An engraving machine or the like as claimed in claim 29, in which the means for controlling the relative movements of the four supports includes a pantograph which carries the bearings of the work and copy supports and of which the two links carrying the gear wheels form part.

31. The combination with the features set forth in claim 28, of orienting means comprising a duplex parallelogram linkage for maintaining datum axes on the work and copy supports at any chosen angle to the primary plane during the relative movements of the four supports.

32. An engraving machine or the like as claimed in claim 24, in which the means for synchronously rotating the work and copy supports include two links pivoted to one another and connected respectively to the bearings for the two supports, a main gear wheel on each of such supports, a further main gear wheel at the pivot point between the two links, and an idler gear wheel journalled on each link and meshing with the two main gear wheels associated with the link, the three main gear wheels all being of the same size.

33. An engraving machine or the like as claimed in claim 8, in which the means for synchronously rotating the work and copy supports include a plurality of links pivoted to one another in chain formation connecting the bearings for the two supports, a main gear wheel on each of such supports, a further main gear wheel at each pivot point in the chain of links, and idler gear wheels interconnecting the main gear wheels in chain formation, all the main gear wheels being of the same size and being interconnected with one another at unity gear ratio.

34. An engraving machine or the like as claimed in claim 16, in which the means for synchronously rotating the work and copy supports include a plurality of links pivoted to one another in chain formation connecting the bearings for the two supports, a main gear wheel on each of such supports, a further main gear wheel at each pivot point in the chain of links, and idler gear wheels interconnecting the main gear wheels in chain formation, all the main gear wheels being of the same size and being interconnected with one another at unity gear ratio.

35. An engraving machine or the like including in combination a tool support, a tracer support, a fixed slideway along which such supports can slide so that datum points or origins on the supports have variable normal operative positions in a primary plane parallel to the slideway, means for maintaining constant the ratio between the distances of the tool and tracer support origins from a primary axis in the primary plane, an arm pivoted about such primary axis, a work support and a copy support rotatably carried by such arm with their axes parallel to and coplanar with the primary axis and with the ratio between the distances of such axes from the primary axis equal to the ratio of the distances of the tool and tracer support origins therefrom, means for synchronously rotating the work and copy supports about their axes, a radius arm extending from one of such support axes, a fixed pivot member at a distance from the primary axis equal to the length of the radius arm, a link pivoted at one end to such pivot member and at the other end to the free end of the radius arm and having a length equal to the distance between the primary axis and the axis from which the radius arm extends whereby the radius arm is maintained parallel to the line joining the primary axis and the fixed pivot member, and means for clamping the radius arm to the associated support in any chosen angular position of adjustment thereon.

36. An engraving machine or the like including in combination a tool support, a tracer support, a fixed slideway along which such supports can slide so that datum points or origins on the supports have variable normal operative positions in a primary plane parallel to the slideway, means for maintaining constant the ratio between the distances of the tool and tracer support origins from a primary axis in the primary plane, an arm pivoted about such primary axis, a work support and a copy support rotatably carried by such arm with their axes parallel to and coplanar with the primary axis and with the ratio between the distances of such axes from the primary axis equal to the ratio of the distances of the tool and tracer support origins therefrom, means for synchronously rotating the work and copy supports about their axes, orienting means for holding the work and copy supports in a fixed rotational position of adjustment relatively to the primary plane during relative movement of the four supports, a second slideway on the tracer support perpendicular to the fixed slideway, a microscope adjustable along the second slideway, means for clamping the microscope to the second slideway in a zero position with its optical axis passing through the tracer support origin or at a measured distance from such zero position, and a second microscope carried by the arm carrying the work and copy supports and having its optical axis coincident with the work support axis, the two microscopes serving to ensure that the operative point of the tool is accurately located on the work support axis when the tracer support origin is on the copy support axis and also to ensure accurate location of the copy support axis at a measured distance from the primary plane.

37. An engraving machine or the like including in combination a tool support and a tracer support respectively having datum points or origins normally occupying fixed operative positions in a primary plane containing a primary axis, a work support, a copy support, means for synchronously rotating the work and copy supports about axes which remain parallel to and coplanar with the primary axis but can move relatively to the primary plane, means such as a pantograph for controlling the movements of the work and copy support axes in such a manner that the ratio of their distances from the primary axis is maintained equal to the ratio of the distances of the tool and tracer support origins from such axis, means whereby the work and copy supports can be held in a fixed rotational position of adjustment relatively to the primary plane during the movements of their axes, a slideway parallel to the primary plane, a second slideway perpendicular to and adjustable along the first slideway, means for clamping the second slideway to the first at a measured distance from the tracer support origin, a microscope adjustable along the second slideway, means for clamping such microscope to the second slideway in a position in which its optical axis is at a measured distance from the primary plane, and a second microscope mounted with its optical axis coincident with the work support axis, the two microscopes serving to ensure that the operative point of the tool is accurately located on the work support axis when the tracer support origin is on the copy support axis and also to ensure accurate location of a chosen point on the copy support at a measured distance from the primary plane or from the tracer support origin.

38. The combination with the features of claim 36, of a tool carriage, means for adjusting the tool relatively to the primary plane on the tool carriage so as to enable the operative point of the tool to be located accurately at the tool support origin, means for swivelling the tool carriage on the tool support about the tool support origin, and means for reciprocating the tool on the tool carriage whereby the operative point of the tool reciprocates along a line which passes through the tool support origin and whose inclination to the primary plane can be varied.

39. The combination with the features of claim 37, of a tool carriage, means for adjusting the tool relatively to the primary plane on the tool carriage so as to enable the operative point of the tool to be located accurately at the tool support origin, means for swivelling the tool carriage on the tool support about the tool support origin, and means for reciprocating the tool on the tool carriage whereby the operative point of the tool reciprocates along a line which passes through the tool support origin and whose inclination to the primary plane can be varied.

40. Transmission mechanism for maintaining exact synchronism between the rotations of two parallel shafts whose bearings are movable relatively to one another in space, comprising a plurality of links pivoted to one another in chain formation connecting the bearings for the two shafts, a main gear wheel on each shaft, a further main gear wheel at each pivot point of the chain of links, and idler gear wheels interconnecting the main gear wheels in chain formation, all the main gear wheels being of the same size and being interconnected with one another at unity gear ratio.

41. Transmission mechanism for maintaining exact synchronism between the rotations of two parallel shafts whose bearings are movable relatively to one another in space, comprising two links pivoted to one another and connected respectively to the bearings of the two shafts, three main gear wheels of equal size respectively on the two shafts and at the pivot point between the two links, and an idler gear wheel journalled on each link and meshing with the two main gear wheels associated with the link.

42. The combination with the features set forth in claim 40, of orienting means for maintaining the shafts in a fixed rotational position of adjustment so that datum axes carried by the shafts at right angles to the shaft axis will be maintained at constant inclination to a fixed primary plane during movement of the shaft axes relative to such plane.

43. The combination with the features set forth in claim 40, of orienting means for maintaining the shafts in a fixed rotational position of adjustment during their relative movement in space, comprising an arm radiating from one of the shafts, a second arm radiating from a fixed primary axis, and a duplex parallelogram linkage connecting the two arms.

44. The combination with the features set forth in claim 41, of orienting means for maintaining the shafts in a fixed rotational position of adjustment during their relative movement in space, comprising a link pivoted about a fixed primary axis, a second link pivoted at one end to such link and at the other end to the bearings of one of the shafts, a radius arm extending from such shaft, a parallelogram linkage including such arm and the second link, a fixed pivot member in the neighbourhood of the primary axis, a second parallelogram linkage including the first link and having one corner at the fixed pivot member, means for interconnecting the two parallelogram linkages in such a manner as to maintain the radius arm in a fixed orientation relatively to the line joining the primary axis and the fixed pivot member, and means for clamping the radius arm to its shaft in any chosen angular position thereon.

45. The combination with the features set forth in claim 11, of means for holding the tracer support and the copy support in a zero position in which the axis of rotation of the copy support passes through the tracer support origin and a datum axis on the copy support lies parallel to the primary plane, a second member which can be adjusted to bring a pivot axis therein to the position on the copy support corresponding to the centre of the desired arc by sliding the tracer support along the fixed slideway through a measured distance from the zero position and rotating the copy support through a measured angle from the zero position, means for clamping the second member to the copy support in such position of adjustment, comprising two pivots mounted at fixed points on the copy support, two links respectively rotatable about such pivots and capable of sliding over the pivots the links carrying the second member at their point of intersection, and means for clamping the links to their pivots in any desired angular positions thereon, and a microscope mounted on the first member with its optical axis coincident with the pivot axis therein for ensuring that the copy and tracer supports are accurately located in the zero position and that the pivot axis in the second member is accurately located in the correct position of adjustment on the copy support, the two members being held in pivotal engagement with one another with their pivot axes coincident for generating the desired circular arc.

46. An engraving machine or the like including in combination, a tool support, a work support, a third support, a fourth support, the said supports being relatively movable, interconnecting means whereby the relative movement of the tool and work supports is a scale reproduction of the relative movement of the third and fourth supports, and measuring means for locating the third and fourth supports in such relative positions that a chosen point on the fourth support is at a measured distance from a datum point on the third support.

47. An engraving machine or the like including in combination, a tool support, a work support, a third support, a fourth support, the said supports being relatively movable, interconnecting means whereby the relative movement of the tool and work supports is a scale reproduction of the relative movement of the third and fourth supports, and means for determining by rectangular coordinate measurement the point on the fourth support which bears a chosen positional relationship to a datum point on such support and for locating such point at a measured distance from a datum point on the third support.

48. An engraving machine or the like including in combination, a tool support, a work support, a third support, a fourth support, the said supports being relatively movable, interconnecting means whereby the relative movement of the tool and work supports is a scale reproduction of the relative movement of the third and fourth supports, and means for determining by polar coordinate measurement the point on the fourth support which bears a chosen positional relationship to a datum point on such support, and for locating such point at a measured distance from a datum point on the third support.

49. An engraving machine or the like including in combination, a tool support, a work support, a third support, a fourth support, the said supports being relatively movable, interconnecting means whereby the relative movement of the tool and work supports is a scale reproduction of the relative movement of the third and fourth supports, and a part carried by the fourth support and angularly adjustable to bring a datum axis on the said part at a measured angle to a datum axis on the fourth support.

50. An engraving machine or the like including in combination, a tool support, a work support, a third support, a fourth support, the said supports being relatively movable, interconnecting means whereby the relative movement of the tool and work supports is a scale reproduction of the relative movement of the third and fourth supports, measuring means for locating the third and fourth supports in such relative positions that a chosen point on the fourth support is at a measured distance from a datum point on the third support, and a part carried by the fourth support and angularly adjustable to bring a datum axis on the said part at a measured angle to a datum axis on the fourth support.

51. An engraving machine or the like including in combination a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, and measuring means associated with the tracer support for locating the tracer and copy supports in such relative positions that a chosen point on the copy support is at a measured distance from a datum point or origin on the tracer support.

52. An engraving machine or the like including in combination, a tool support, a work support, a tracer support, a copy support, such supports being relatively movable, interconnecting mechanism whereby the relative movement of the tool and work supports is a scale reproduction of the relative movement of the tracer and copy supports, a carrier associated with the tracer support, a sighting device mounted on the carrier for sighting on a chosen point on the copy support, and means for adjusting the carrier into a position in which the optical axis of the sighting device is at a measured distance from a datum point or origin on the tracer support.

53. An engraving machine or the like including in combination, a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, a carrier associated with the tracer support and adjustable relatively thereto, a sighting device mounted on the carrier, a pivot member mounted on the carrier with the axis of the pivot member coincident with the optical axis of the sighting device, and means whereby the pivot member can be clamped to the tracer support with the axis of the pivot member at a measured distance from a datum point or origin on the tracer support.

54. An engraving machine or the like including in combination a tool support, a work support, a tracer support, a copy support, such supports being relatively movable, interconnecting means whereby the relative movement of the tool and work supports is a scale reproduction of the relative movement of the tracer and copy supports, a carrier associated with the tracer support, a pivot member mounted on the carrier, means whereby the pivot member can be clamped to the tracer support with the axis of the pivot member at a measured distance from the tracer origin, a second pivot member mounted at a chosen point on the copy support, and means whereby the second pivot member can be held in pivotal engagement with the first pivot member.

55. An engraving machine or the like including in combination, a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, an adjustable carrier associated with the tracer support, a pivot member mounted on the carrier, means whereby the pivot member can be clamped to the tracer support with the axis of the pivot member at a measured distance from the tracer origin, a second pivot member mounted at a chosen point on the copy support, means whereby the second pivot member can be held in pivotal engagement with the first pivot member, and means on the copy support for locating and holding the second pivot member in any desired position thereon.

56. An engraving machine or the like including in combination, a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, an adjustable carrier associated with the tracer support, a pivot member mounted on the carrier, means whereby the pivot member can be clamped to the tracer support with the axis of the pivot member at a measured distance from the tracer origin, two slide links respectively pivotable about two normally fixed points on the copy support, a second pivot member carried by the said slide links, means for clamping the links to the copy support with the second pivot member at a chosen position thereon, and means whereby the second pivot member can be held in pivotal engagement with the first pivot.

57. An engraving machine or the like including in combination, a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, an adjustable carrier associated with the tracer support, a pivot member mounted on the carrier, means whereby the pivot member can be clamped to the tracer support with the axis of the pivot member at a measured distance from the tracer origin, a second pivot carried by the copy support at a chosen point thereon, means for locating the second pivot member in the desired position on the copy support by rectangular coordinate measurement, and means whereby the second pivot member can be held in pivotal engagement with the first pivot member.

58. An engraving machine or the like including in combination, a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, an adjustable carrier associated with the tracer support, a pivot member mounted on the carrier, means whereby the pivot member can be clamped to the tracer support with the axis of the pivot member at a measured distance from the tracer origin, a second pivot member carried by the copy support at a chosen point thereon, means for locating the second pivot member in the desired position on the copy support by polar coordinate measurement, and means whereby the second pivot member can be held in pivotal engagement with the first pivot member.

59. An engraving machine or the like including in combination a tool support, a work support, a tracer support, a copy support, such supports being relatively movable, means for mechanically interconnecting the four supports in such a manner that during normal operation of the machine the geometric relationship (at least in two dimensions) between the tool and work supports or the elements carried thereon is maintained in strict ratio to that between the tracer and copy supports or elements carried thereon, and means associated with the tracer support and adjustable in two mutually perpendicular directions whereby a point on the copy support can be located by rectangular coordinate measurement relatively to a datum point or origin on the tracer.

60. An engraving machine or the like including in combination a tool support, a work support, a third support, a fourth support, the said supports being relatively movable, interconnecting means whereby the relative movement of the tool and work supports is a scale reproduction of the relative movement of the third and fourth supports, and means for holding the third and fourth supports in pivotal engagement about an axis which passes through a chosen point on the fourth support and is at a measured distance from a datum point on the third support, whereby the interconnecting mechanism is constrained to cause relative movement between the tool and work supports such that a datum point on the tool support generates a circular arc concentric with a point whose position on the work support corresponds to the position of the chosen point on the fourth support and at a radius corresponding to the said measured distance.

61. An engraving machine or the like including in combination a tool support, a work support, a third support, a fourth support, the said supports being relatively movable, interconnecting means whereby the relative movement of the tool and work supports is a scale reproduction of the relative movement of the third and fourth supports, means for determining by rectangular coordinate measurement the point on the fourth support which bears a chosen positional relationship to a datum point on such support and for locating such chosen point at a measured distance from a datum point on the third support, and means for holding the third and fourth supports in pivotal engagement about the said chosen point when so located, whereby the interconnecting mechanism is constrained to cause relative movement between the tool and work supports such that a datum point on the tool support generates a circular arc concentric with a point whose position on the work support corresponds to the position of the chosen point on the fourth support and at a radius corresponding to the said measured distance.

62. An engraving machine or the like including in combination a tool support, a work support, a third support, a fourth support, the said supports being relatively movable, interconnecting means whereby the relative movement of the tool and work supports is a scale reproduction of the relative movement of the third and fourth supports, means for determining by polar coordinate measurement the point on the fourth support which bears a chosen positional relationship to a datum point on such support and for locating such chosen point at a measured distance from a datum point on the third support, and means for holding the third and fourth supports in pivotal engagement about the said chosen point when so located, whereby the interconnecting mechanism is constrained to cause relative movement between the tool and work supports such that a datum point on the tool support generates a circular arc concentric with a point whose position on the work support corresponds to the position of the chosen point on the fourth support and at a radius corresponding to the said measured distance.

63. An engraving machine or the like including in combination a tool support, a work support, a third support, a fourth support, the said supports being relatively movable, interconnecting means whereby the relative movement of the tool and work supports is a scale reproduction of the relative movement of the third and fourth supports, a part carried by the fourth support and angularly adjustable thereon, measuring means whereby with the aid of such part the fourth support can be angularly adjusted to bring a datum axis thereon parallel to a predetermined direction, clamping means for maintaining the datum axis on the fourth support parallel to the said direction during relative movement between the four supports, and means for locating and holding the third and fourth supports in such relative positions that the datum axis on the fourth support is at a measured distance from a datum point on the third support, whereby the interconnecting mechanism is constrained to cause relative movement between the tool and work supports such that a datum point on the tool support will generate a straight line whose position and inclination on the work support correspond to the position and inclination of the datum axis on the fourth support.

REGINALD VICTOR RODWELL,
*Executor of William Taylor, Deceased.*
ERNEST ALBERT COOKE.

CERTIFICATE OF CORRECTION.

Patent No. 2,179,388. November 7, 1939.

REGINALD VICTOR RODWELL, EXECUTOR of WILLIAM TAYLOR, deceased, ET AL.

It is hereby certified that error appears in the printed specification of the above numbered patent requiring correction as follows: Page 1, first column, line 16, after "work" insert or; page 2, first column, line 21, for "facing $D^3$" read facing $D^4$; line 40, for "slidway" read slideway; page 4, first column, line 46, for "mocroscope" read microscope; and second column, line 5, after the word "measurement" insert a period; line 46, for "dgree" read degree; page 5, first column, line 59, for "traver" read tracer; page 9, second column, line 63, claim 27, for the word "radium" read radius; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.